US012618173B2

(12) United States Patent
Ye et al.

(10) Patent No.: US 12,618,173 B2
(45) Date of Patent: May 5, 2026

(54) HIGH MODULUS GEL-SPUN PVDF FIBER THIN FILMS

(71) Applicant: Meta Platforms Technologies, LLC, Menlo Park, CA (US)

(72) Inventors: Sheng Ye, Redmond, WA (US); Jing Chen, Redmond, WA (US); Hao Mei, Redmond, WA (US); Andrew John Ouderkirk, Kirkland, WA (US); Arman Boromand, Issaquah, WA (US); Kristy Alana Jost, Redmond, WA (US); Nagi Hosni Elabbasi, Southborough, MA (US); Jonathan Robert Peterson, Woodinville, WA (US); Christopher Yuan Ting Liao, Seattle, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 672 days.

(21) Appl. No.: 18/149,596

(22) Filed: Jan. 3, 2023

(65) Prior Publication Data

US 2023/0279585 A1     Sep. 7, 2023

Related U.S. Application Data

(60) Provisional application No. 63/315,695, filed on Mar. 2, 2022.

(51) Int. Cl.
*C08L 27/16* (2006.01)
*C08J 5/18* (2006.01)
(Continued)

(52) U.S. Cl.
CPC .............. *D01D 5/0038* (2013.01); *C08J 5/18* (2013.01); *G02B 27/017* (2013.01);
(Continued)

(58) Field of Classification Search
None
See application file for complete search history.

(56) References Cited

U.S. PATENT DOCUMENTS

| | | | |
|---|---|---|---|
| 11,987,677 B2 * | 5/2024 | Ye | H10N 30/857 |
| 2003/0194578 A1 | 10/2003 | Tam et al. | |
| 2022/0254989 A1 * | 8/2022 | Ouderkirk | C08F 14/22 |

FOREIGN PATENT DOCUMENTS

| | | |
|---|---|---|
| CN | 107641898 A | 1/2018 |
| EP | 0703266 A1 | 3/1996 |

OTHER PUBLICATIONS

International Preliminary Report on Patentability for International Application No. PCT/US2023/014240, mailed Sep. 12, 2024, 8 pages.

(Continued)

*Primary Examiner* — Richard A. Huhn

(74) *Attorney, Agent, or Firm* — Greenberg Traurig, LLP

(57) ABSTRACT

Mechanically and piezoelectrically anisotropic polymer fibers may be formed by spinning a polymer solution or gel that includes a high molecular weight crystallizable polymer and a liquid solvent. The solvent may be configured to interact with the polymer to facilitate chain alignment and, in some examples, create a higher crystalline content within the spun fibers. The polymer solution may also include a low molecular weight additive. The high and low molecular weight polymers may each be characterized by a bimodal molecular weight distribution where the molecular weight of the additive is less than the molecular weight of the crystallizable polymer. The polymer(s) and the additive(s) may be independently selected from vinylidene fluoride, trifluoroethylene, chlorotrifluoroethylene, hexafluoropropene, vinyl fluoride, etc. The spun fibers may be oriented, annealed, poled, and woven or laminated to form a polymer (Continued)

100 thin film having a high elastic modulus and a high electro-mechanical coupling factor.

19 Claims, 10 Drawing Sheets

(51) Int. Cl.
  *D01D 5/00* (2006.01)
  *G02B 27/01* (2006.01)
(52) U.S. Cl.
  CPC ........... *C08J 2327/12* (2013.01); *C08L 27/16* (2013.01); *G02B 2027/0178* (2013.01)

(56) References Cited

OTHER PUBLICATIONS

Baur C., et al., "Enhanced Piezoelectric Performance from Carbon Fluoropolymer Nanocomposites," Journal of Applied Physics, Dec. 15, 2012, vol. 112, No. 12, 7 pages.
International Search Report and Written Opinion for International Application No. PCT/US2023/014240, mailed Jul. 4, 2023, 10 pages.
Martins P., et al., Electroactive Phases of Poly (Vinylidene Fluoride); Determination, Processing and Applications, Progress in Polymer Science, Jan. 1, 2014 [Available online Jul. 20, 2013], vol. 39, No. 4, pp. 683-706.

* cited by examiner

Gel Spinning by Solvent Bath to Form PVDF Fiber

Gel Spinning by Hot Air to form PVDF Fiber

Electro-Spinning to Form PVDF Fiber

HIGH MODULUS GEL-SPUN PVDF FIBER THIN FILMS

CROSS-REFERENCE TO RELATED APPLICATION

This application claims the benefit of priority under 35 U.S.C. § 119(e) of U.S. Provisional Application No. 63/315, 695, filed Mar. 2, 2022, the contents of which are incorporated herein by reference in their entirety.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
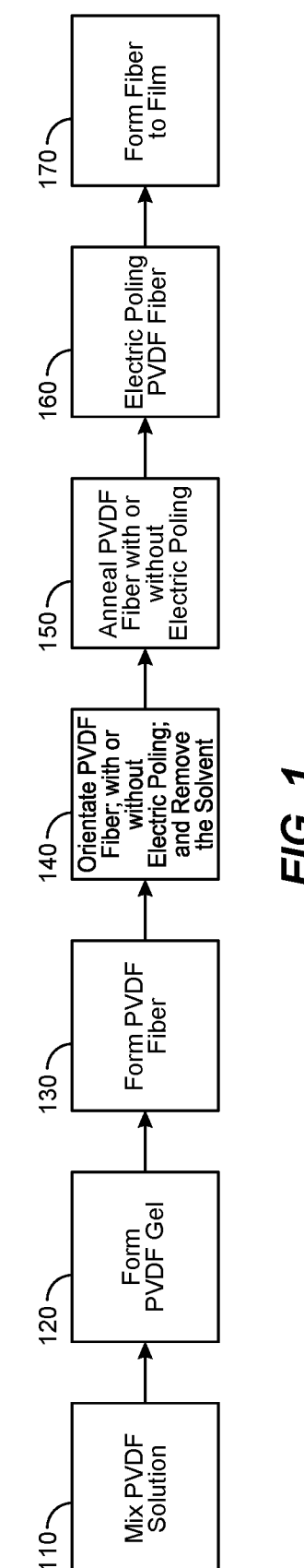
FIG. 1 is a flow chart of an example method for forming a spun PVDF fiber polymer thin film according to various embodiments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

Polymer materials may be incorporated into a variety of different optic and electro-optic device architectures, including active and passive optics and electroactive devices. Lightweight and conformable, one or more polymer layers may be incorporated into wearable devices such as smart glasses and are attractive candidates for emerging technologies including virtual reality/augmented reality devices where a comfortable, adjustable form factor is desired.

Virtual reality (VR) and augmented reality (AR) eyewear devices or headsets, for instance, may enable users to experience events, such as interactions with people in a computer-generated simulation of a three-dimensional world or viewing data superimposed on a real-world view. By way of example, superimposing information onto a field of view may be achieved through an optical head-mounted display (OHMD) or by using embedded wireless glasses with a transparent heads-up display (HUD) or augmented reality (AR) overlay. VR/AR eyewear devices and headsets may be used for a variety of purposes. Governments may use such devices for military training, medical professionals may use such devices to simulate surgery, and engineers may use such devices as design visualization aids.

These and other applications may leverage one or more characteristics of thin film polymer materials, including piezoelectric properties to induce deformations and the refractive index to manipulate light. In various applications, optical elements and other components may include polymer thin films that have anisotropic mechanical or optical properties. The degree of optical or mechanical anisotropy achievable through conventional thin film manufacturing processes is typically limited, however, and is often exchanged for competing thin film properties such as flatness, toughness and/or film strength. For example, highly anisotropic polymer thin films often exhibit low strength in one or more in-plane direction, which may challenge manufacturability and limit throughput.

According to some embodiments, oriented piezoelectric polymer thin films may be implemented as an actuatable lens substrate in an optical element such as a liquid lens. Uniaxially-oriented polyvinylidene fluoride (PVDF) thin films, for example, may be used to generate an advantageously anisotropic strain map across the field of view of a lens. However, a low piezoelectric response and/or lack of sufficient optical quality may impede the implementation of PVDF thin films as an actuatable layer.

Notwithstanding recent developments, it would be advantageous to provide mechanically robust, and mechanically and piezoelectrically isotropic or anisotropic polymer thin films that may be incorporated into various optical systems including display systems for artificial reality applications. Example polymer thin films may include optical quality thin films. The instant disclosure is thus directed generally to polymer thin films having a high modulus and a high piezoelectric response and their methods of manufacture, and more specifically to gel-spinning or electro-spinning methods for forming PVDF fiber-based thin films having a high electromechanical efficiency. In particular embodiments, PVDF thin films may be formed by weaving, laminating, compressing, or otherwise assembling PVDF fibers.

The refractive index and piezoelectric response of a polymer fiber or thin film may be determined by its chemical composition, the chemical structure of the polymer repeat unit, its density and extent of crystallinity, as well as the alignment of the crystals and/or polymer chains. Among these factors, the crystal or polymer chain alignment may dominate. In crystalline polymer fibers and thin films, the piezoelectric response may be correlated to the degree or extent of crystal orientation, whereas the degree or extent of chain alignment may create comparable piezoelectric response in amorphous polymer fibers and thin films.

An applied stress may be used to create a preferred alignment of crystals or polymer chains within a polymer fiber and induce a corresponding modification of the refractive index and piezoelectric response along the fiber axis. As disclosed further herein, during processing where a polymer fiber is stretched to induce a preferred alignment of crystals/ polymer chains and an attendant modification of the refractive index and piezoelectric response, Applicants have shown that a gel-spinning or electro-spinning method and the choice of liquid solvent to form a polymer solution as a precursor to a spinnable gel may decrease the propensity for polymer chain entanglement within the spun fiber.

In accordance with particular embodiments, Applicants have developed polymer fiber and thin film manufacturing methods for forming PVDF fiber-based polymer thin films having a high modulus and a desired piezoelectric response. Whereas in PVDF and related polymers, the total extent of crystallization as well as the alignment of crystals may be limited due to polymer chain entanglement, as disclosed herein a gel-spinning or electro-spinning method may facilitate the disentanglement and alignment of polymer chains, which may lead to improvements in the mechanical strength of a polymer fiber or thin film as well as its piezoelectric response.

PVDF thin films may be formed by weaving, laminating, compressing, or otherwise assembling spun PVDF fibers. An example method may include forming a PVDF solution by combining a crystallizable polymer and a liquid solvent, forming a gel from the PVDF solution by cooling or removing at least some of the liquid solvent, forming a PVDF fiber from the gel, stretching the fiber to orient the fiber's microstructure, optionally removing any remaining solvent from the oriented fiber, annealing the fiber, poling the fiber, and forming the fiber into a polymer thin film having a high electromechanical efficiency. As disclosed further herein, the acts of stretching, annealing, and poling may be performed in succession and/or in any concurrent processing paradigm.

PVDF polymer fibers may be formed from a crystallizable polymer. Example crystallizable polymers may include moieties such as vinylidene fluoride (VDF), trifluoroethylene (TrFE), chlorotrifluoroethylene (CTFE), hexafluoropropene (HFP), and vinyl fluoride (VF). According to various embodiments, a polymer fiber or thin film may include one or more of the foregoing moieties, as well as mixtures and co-polymers thereof. As used herein, one or more of the foregoing "PVDF-family" moieties may be combined with a low molecular weight additive to form a high modulus PVDF fiber or thin film. Reference herein to a PVDF fiber or thin film includes reference to any PVDF-family member-containing polymer fiber or thin film unless the context clearly indicates otherwise. As will be appreciated, high piezoelectric performance may be associated with the creation and alignment of beta phase crystals in PVDF-family polymers.

The crystallizable polymer component of a PVDF fiber or thin film may have a molecular weight ("high molecular weight") of at least approximately 100,000 g/mol, e.g., at least approximately 100,000 g/mol, at least approximately 150,000 g/mol, at least approximately 200,000 g/mol, at least approximately 250,000 g/mol, at least approximately 300,000 g/mol, at least approximately 350,000 g/mol, at least approximately 400,000 g/mol, at least approximately 450,000 g/mol, or at least approximately 500,000 g/mol, including ranges between any of the foregoing values.

If provided, a "low molecular weight" additive may have a molecular weight of less than approximately 200,000 g/mol, e.g., less than approximately 200,000 g/mol, less than approximately 100,000 g/mol, less than approximately 50,000 g/mol, less than approximately 25,000 g/mol, less than approximately 10,000 g/mol, less than approximately 5000 g/mol, less than approximately 2000 g/mol, less than approximately 1000 g/mol, less than approximately 500 g/mol, less than approximately 200 g/mol, or less than approximately 100 g/mol, including ranges between any of the foregoing values.

The molecular weight of the low molecular weight additive may be less than the molecular weight of the high molecular weight crystallizable polymer. In some embodiments, the average molecular weight of the low molecular weight polymer (additive) may be approximately 1% to approximately 40% of the average molecular weight of the high molecular weight polymer, e.g., approximately 1%, approximately 2%, approximately 5%, approximately 10%, approximately 20%, approximately 30%, or approximately 40%, including ranges between any of the foregoing values.

Example low molecular weight additives may include oligomers and polymers of vinylidene fluoride (VDF), trifluoroethylene (TrFE), chlorotrifluoroethylene (CTFE), hexafluoropropene (HFP), and vinyl fluoride (VF), as well as homopolymers, co-polymers, tri-polymers, derivatives, and combinations thereof. Such additives may be readily soluble in, and provide refractive index matching with, the high molecular weight component. For example, an additive may have a refractive index measured at 652.9 nm of from approximately 1.38 to approximately 1.55. Such an oligomeric or polymeric low molecular weight additive may constitute from approximately 0.1 wt. % to approximately 90 wt. % of a PVDF fiber, e.g., 0.1 wt. %, 0.2 wt. %, 0.5 wt. %, 1 wt. %, 2 wt. %, 5 wt. %, 10 wt. %, 20 wt. %, 30 wt. %, 40 wt. %, 50 wt. %, 60 wt. %, 70 wt. %, 80 wt. %, or 90 wt. %, including ranges between any of the foregoing values.

According to some embodiments, further example low molecular weight additives may include a lubricant. The addition of one or more lubricants may provide intermolecular interactions with PVDF-family member chains and a beneficially lower melt viscosity. Example lubricants may include metal soaps, hydrocarbon waxes, low molecular weight polyethylene, fluoropolymers, amide waxes, fatty acids, fatty alcohols, and esters.

Further example low molecular weight additives may include oligomers and polymers that may have polar interactions with PVDF-family member chains. Such oligomers and polymers may include ester, ether, hydroxyl, phosphate, fluorine, halogen, or nitrile groups. Particular examples include polymethylmethacrylate, polyethylene glycol, and polyvinyl acetate. PVDF polymer and PVDF oligomer-based additives, for example, may include a reactive group such as vinyl, acrylate, methacrylate, epoxy, isocyanate, hydroxyl, or amine, and the like. Such additives may be cured in situ, i.e., within a polymer fiber or thin film, by applying one or more of heat or light or by reaction with a suitable catalyst.

Still further example polar additives may include ionic liquids, such as 1-octadecyl-3-methylimidazolium bromide, 1-butyl-3-methylimidazolium[$PF_6$], 1-butyl-3-methylimida-zolium[$BF_4$], 1-butyl-3-methylimidazolium[$FeCl_4$] or [1-butyl-3-methylimidazolium[Cl]. According to some embodiments, the amount of an ionic liquid may range from approximately 1 to 15 wt. % of a spun PVDF fiber.

In some examples, the low molecular weight additive may include an inorganic compound. An inorganic additive may increase the piezoelectric performance of a PVDF fiber or thin film. Example inorganic additives may include nanoparticles (e.g., ceramic nanoparticles such as PZT, BNT, or quartz; or metal or metal oxide nanoparticles), ferrite nano-composites (e.g., $Fe_2O_3$—$CoFe_2O_4$), and hydrated salts or metal halides, such as LiCl, $Al(NO_3)_3$-$9H_2O$, $BiCl_3$, Ce or Y nitrate hexahydrate, or Mg chlorate hexahydrate. The amount of an inorganic additive may range from approximately 0.001 to 5 wt. % of a spun PVDF fiber.

Generally, the low molecular weight additive may constitute up to approximately 90 wt. % of a polymer fiber or thin film, e.g., approximately 0.001 wt. %, approximately 0.002 wt. %, approximately 0.005 wt. %, approximately 0.01 wt. %, approximately 0.02 wt. %, approximately 0.05 wt. %, approximately 0.1 wt. %, approximately 0.2 wt. %, approximately 0.5 wt. %, approximately 1 wt. %, approximately 2 wt. %, approximately 5 wt. %, approximately 10 wt. %, approximately 20 wt. %, approximately 30 wt. %, approximately 40 wt. %, approximately 50 wt. %, approximately 60 wt. %, approximately 70 wt. %, approximately 80 wt. %, or approximately 90 wt. %, including ranges between any of the foregoing values.

In some embodiments, one or more additives may be used. According to particular examples, an original additive may be used during processing of a fiber (e.g., during spinning, orienting, annealing and/or poling). Thereafter, the original additive may be removed and replaced by a secondary additive. Micro and macro voids produced during solvent removal or stretching processes may be filled by the secondary additive, for example. A secondary additive may be index matched to the crystalline polymer and may, for example, have a refractive index ranging from approximately 1.38 to approximately 1.55. A secondary additive may be added by soaking the fiber or thin film in a melting condition or in a solvent bath. A secondary additive may have a melting point of less than 100° C.

In some embodiments, a PVDF fiber or PVDF fiber thin film may include an antioxidant. Example antioxidants include hindered phenols, phosphites, thiosynergists, hydroxylamines, and oligomer hindered amine light stabilizers (HALS).

According to one example, the crystallizable polymer may have a molecular weight of at least approximately 100,000 g/mol and the additive may have a molecular weight of less than approximately 25,000 g/mol. According to a further example, the crystallizable polymer may have a molecular weight of at least approximately 300,000 g/mol and the additive may have a molecular weight of less than approximately 200,000 g/mol. Use herein of the term "molecular weight" may, in some examples, refer to a weight average molecular weight.

In accordance with various embodiments, a polymer composition used to form a spun PVDF fiber may include a crystallizable polymer and a low molecular weight additive. Without wishing to be bound by theory, one or more low molecular weight additives may interact with high molecular weight polymers throughout spinning, orienting, annealing, and poling processes to facilitate less chain entanglement and better chain alignment and, in some examples, create a higher crystalline content within the polymer composition. That is, a composition having a bimodal molecular weight distribution may be spun to form fibers that are stretched to induce mechanical and piezoelectric anisotropy through crystal and/or chain realignment. Stretching may include the application of a uniaxial stress. Oriented PVDF fibers may be annealed and poled and then assembled (e.g., woven or laminated) to form a PVDF fiber thin film. Thus, in some exemplary embodiments, a "fiber thin film" may be formed from, and may therefore include, one or a plurality of spun PVDF fibers.

A polymer fiber may be formed by gel-spinning or electro-spinning from a polymer solution or gel. Gel-spinning or electro-spinning processes may provide control of one or more of the solvent, polymer concentration, and spinning temperature, for example, and may facilitate decreased entanglement of polymer chains and allow the polymer fiber to achieve a higher stretch ratio during a later orienting step. In some cases, one or more low molecular weight additives may be added to the polymer solution. A polymer solution may include one or more crystallizable polymers and one or more liquid solvents.

In certain examples, the molecular weight distribution for the high and low molecular weight polymers may be independently chosen from mono-disperse, bimodal, or polydisperse. A polymer (e.g., a high molecular weight polymer or a low molecular weight polymer) having a bimodal molecular weight distribution may be characterized by two molecular weight distribution maxima, one in a low(er) molecular weight region and one in a high(er) molecular weight region. The molecular weight of a PVDF polymer may be characterized by its polydispersity.

The polydispersity (or heterogeneity index) is a measure of the broadness of a molecular weight distribution of a polymer and may be used to characterize a polymer composition. The polydispersity index (PDI) may be calculated as the ratio of weight average molecular weight (Mw) to number average molecular weight (Mn) of a polymer sample, i.e., PDI=Mw/Mn. In accordance with certain embodiments, example high molecular weight polymers may have a polydispersity index of at least approximately 2, e.g., approximately 2, approximately 2.5, approximately 3, approximately 3.5, or approximately 4 or more, including ranges between any of the foregoing values.

The choice of solvent may affect the maximum crystallinity and percent beta phase content of a PVDF-based polymer thin film. In addition, the polarity of the solvent may impact the critical polymer concentration (c*) for polymer chains to entangle in solution.

The liquid solvent (i.e., "solvent") may include a single solvent composition or a mixture of different solvents. In some embodiments, the solubility of the crystallizable polymer in the liquid solvent may be at least approximately 0.1 g/100 g (e.g., 1 g/100 g or 10 g/100 g) at a temperature of 25° C. or more (e.g., 50° C., 75° C., 100° C., or 150° C.). Example solvents include, but are not limited to, dimethyl-formamide (DMF), cyclohexanone, dimethylacetamide (DMAc), diacetone alcohol, di-isobutyl ketone, tetramethyl urea, ethyl acetoacetate, dimethyl sulfoxide (DMSO), trimethyl phosphate, N-methyl-2-pyrrolidone (NMP), butyrolactone, isophorone, triethyl phosphate, carbitol acetate, propylene carbonate, glyceryl triacetate, dimethyl phthalate, acetone, tetrahydrofuran (THF), methyl ethyl ketone, methyl isobutyl ketone, glycol ethers, glycol ether esters, and N-butyl acetate.

A polymer gel may be obtained from the polymer solution by cooling the solution, evaporating the solvent, adding a relatively poor solvent to the polymer solution, or a combination thereof. Solvent removal may include a solvent washing step where the solvent is partially or wholly replaced with a secondary solvent that is then partially or completely removed. The solubility of the crystalline polymer in a poor solvent may be less than 20 g/100 g, e.g., 5 g/100 g or 1 g/100 g at a temperature of less than approximately 150° C., e.g., 75° C., 25° C., −40° C., or −70° C. The polymer gel, which includes a mixture of the crystallizable polymer and the solvent, may be transparent or opaque, and may have a storage modulus and a loss modulus where the storage modulus is greater than the loss modulus.

According to various embodiments, a method of forming a PVDF fiber may include gel spinning. Gel spinning refers to a technique where a polymer gel is extruded through a spinneret nozzle to form a polymer fiber. In an example method, a solvent bath located downstream of the spinneret nozzle and containing a poor solvent may be used to precipitate the fiber. Exemplary dispense rates of the polymer gel through the nozzle, which may be determined based on the rheological properties of the gel, may range from approximately 0.1 to 10 mL/hr. Suitable poor solvents for PVDF may include THF, cyclohexanone, acetone, and the like. The solvent temperature within the solvent bath may be less than approximately 50° C., e.g., less than 50° C., less than 40° C., less than 30° C., less than 20° C., or less than 10° C., including ranges between any of the foregoing values.

According to further embodiments, a PVDF fiber may be spun with a secondary fiber or a solid support to form a composite structure where the PVDF fiber and the secondary fiber or support may have a concentric or parallel configuration, for example. A secondary fiber may be electrically conductive or electrically insulating and may include polyethylene, polycarbonate, poly methyl methacrylate, polyester, polyimide, or intrinsically conductive polymers such as polyacetylene or polyaniline with or without electrically conductive fillers, such as carbon black or metal flakes. Example solid supports include metal wires, carbon fibers, and carbon nanotubes.

According to further embodiments, heated gas may be used in lieu of a solvent bath. The gas may be heated to a temperature less than a melting temperature of the PVDF polymer, but sufficient to evaporate the liquid solvent from the nascent spun fibers. For example, the heated gas temperature may be less than approximately 170° C., e.g., less than 150° C. or less than 100° C.

In an electro-spinning method, a PVDF gel may be dispensed through a spinneret nozzle. Example dispense rates may range from approximately 0.1 to 10 mL/hr. During electro-spinning, a first voltage may be applied to the spinneret nozzle and an opposite voltage may be applied to a collection roller located proximate to the nozzle. The magnitude of the voltages may be independently set. An absolute value of the applied voltages may range from approximately 5 to approximately 100 kV.

An as-spun fiber cross-sectional dimension (e.g., diameter, or major and minor axes) may range from approximately 50 micrometers to approximately 1000 micrometers.

In some embodiments, PVDF polymer fibers having a bimodal molecular weight distribution may be stretched to a larger stretch ratio than PVDF polymer fibers lacking a low molecular weight additive or even PVDF polymer thin films having a bimodal molecular weight distribution. In some examples, a spun PVDF polymer fiber may be stretched under a constant stress of at least approximately 100 MPa, e.g., 100, 150, 200, or 250 MPa, including ranges between any of the foregoing values. In some examples, a fiber stretch ratio may be greater than approximately 8, e.g., 8, 10, 15, 20, 30, 40 or more, where a strain rate may range from approximately $0.1\%\ s^{-1}$ to approximately $300\%\ s^{-1}$. The act of stretching may include a single stretching step or plural (i.e., successive) stretching steps where one or more of a stretching temperature and a strain rate may be independently controlled.

In some embodiments, the crystalline content within the polymer fiber may increase during the act of stretching. In some embodiments, stretching may alter the orientation of crystals within a polymer fiber without substantially changing the crystalline content.

The polymer fibers may be annealed during and/or after orientation. Annealing may be performed at a fixed or variable stretch ratio and/or a fixed or variable applied stress. In some embodiments, a polymer fiber may be annealed while under an applied real stress of at least approximately 100 MPa, e.g., 100, 150, 200, or 250 MPa, including ranges between any of the foregoing values. An annealing temperature may be fixed or variable. A variable annealing temperature, for instance, may increase from an initial annealing temperature to a final annealing temperature. The annealing temperature may be greater than the polymer's glass transition temperature ($T_g$) and, in certain examples, may be less than, substantially equal to, or greater than the temperature corresponding to the onset of melting for the polymer.

An example annealing temperature may be greater than approximately 80° C., e.g., 100° C., 120° C., 140° C., 160° C., or 180° C., including ranges between any of the foregoing values. In embodiments where annealing accompanies orienting, one or both of the temperature and the strain rate may be held constant or varied. For instance, a polymer fiber may be stretched at a first temperature and a first strain rate (e.g., 130° C. and $50\%\ s^{-1}$) to achieve a first stretch ratio. Subsequently, the temperature of the polymer fiber may be increased, and the strain rate may be decreased to a second temperature and a second strain rate (e.g., 165° C. and $5\%\ s^{-1}$) to achieve a second stretch ratio. Without wishing to be bound by theory, annealing may stabilize the orientation of polymer chains and decrease the propensity for shrinkage of the polymer fiber.

Annealing may include a single step process (i.e., at a single temperature) or a multi-step process in the absence of fiber stretching. Multi-step annealing may include heating a polymer fiber to successively greater temperatures. During a multi-step anneal, smaller crystals may melt and recrystallize as larger crystals. With such a process, smaller and medium sized crystals may be reformed as larger crystals, which may result in a higher elastic modulus following multiple annealing steps.

Following orienting of the polymer fiber, the heating may be maintained for a predetermined amount of time, followed by cooling of the polymer fiber. The act of cooling may include allowing the polymer fiber to cool naturally, at a set cooling rate, or by quenching, such as by purging with a low temperature gas, which may thermally stabilize the polymer fiber.

Stretching a PVDF-family fiber may form both alpha and beta phase crystals, although only aligned beta phase crystals contribute to piezoelectric response. During and/or after a stretching process, an electric field may be applied to the polymer fiber. The application of an electric field (i.e., poling) may induce the formation and alignment of beta phase crystals. Whereas a lower electric field (<50 V/micrometer) may be applied to align beta phase crystals, a higher electric field 50 V/micrometer) may be applied to both induce a phase transformation from the alpha phase to the beta phase and encourage alignment of the beta phase crystals.

A corona poling method may be used to align beta phase crystals within a PVDF fiber and may include applying a voltage across a selected dimension of a spun fiber. An applied poling voltage may be at least approximately 200 V/micrometer, e.g., 200, 300, 400, 500, or 600 V/micrometer, including ranges between any of the foregoing values. In some cases, electric poling such as corona poling may be performed during the act of orienting. In some cases, electric poling such as corona poling may be performed during the act of annealing. The applied voltage may be applied along a radial direction of a fiber, i.e., perpendicular or substantially perpendicular to a length direction of the fiber. Example poling times may range from approximately 1 min to approximately 120 min. During poling, a PVDF fiber may be heated to a temperature of from approximately 20° C. to approximately 100° C. According to further embodiments, a corona poling method may be used to align beta phase crystals within a PVDF fiber thin film, such as an aligned or woven thin film.

An oriented PVDF fiber may exhibit high crystallinity and a high elastic modulus. By way of example, an oriented, annealed, and poled PVDF polymer fiber spun from a composition having a bimodal molecular weight distribution may have an elastic modulus of at least approximately 4 GPa, e.g., 4, 6, 8, 10, 12, or 15 GPa, including ranges between any of the foregoing values, and a piezoelectric coefficient ($d_{31}$) greater than 5 pC/N, e.g., greater than 5, 8, 10, 12, or 15 pC/N, including ranges between any of the foregoing values. High piezoelectric performance may be associated with the creation and alignment of beta phase crystals in PVDF-family polymers.

According to some embodiments, the crystalline content of an anisotropic polymer fiber may include crystals of poly(vinylidene fluoride), poly(trifluoroethylene), poly (chlorotrifluoroethylene), poly(hexafluoropropene), and/or poly(vinyl fluoride), for example, although further crystalline polymer materials are contemplated, where a crystalline phase in a "crystalline" polymer thin film may, in some examples, constitute at least approximately 1% of the polymer fiber. For instance, the beta phase content of a polymer fiber may be at least approximately 30%, e.g., 30, 40, 50, 60, 70, or 80%, including ranges between any of the foregoing values.

PVDF fibers may have a circular cross-sectional shape, although further shapes may be formed, including oval, square, rectangular, or trilobal. An oriented PVDF fiber may have a cross-sectional dimension (e.g., diameter) of from approximately 0.1 micrometers to approximately 100 micrometers, e.g., 0.1, 0.2, 0.5, 1, 2, 5, 10, 20, 50, or 100 micrometers, including ranges between any of the foregoing values. As used herein, a "fiber" may be characterized by an aspect ratio (length dimension/cross sectional dimension) of at least approximately 10.

In accordance with various embodiments, a PVDF fiber thin film may be formed by knitting, weaving, or embroidering PVDF fibers. By way of example, a PVDF fiber thin film may be formed by laying up a plurality of fibers, e.g., in a parallel or overlapping array, enveloping the fibers in a cross-linkable resin, and curing the resin. Example resins may include acrylates, epoxies, and urethanes. Curing may be conducted by exposure to actinic radiation, UV light, e-beam radiation, or heat, optionally in conjunction with a catalyst.

Further to the foregoing, an electromechanical coupling factor $k_{ij}$ may indicate the effectiveness with which a piezoelectric material can convert electrical energy into mechanical energy, or vice versa. For a polymer thin film, the electromechanical coupling factor $k_{31}$ may be expressed as $$k_{31} = \frac{d31}{\sqrt{e33 * s31}},$$

where $d_{31}$ is the piezoelectric strain coefficient, $e_{33}$ is the dielectric permittivity along a thickness dimension, and $s_{31}$ is the compliance in a transverse direction. Higher values of $k_{31}$ may be achieved by disentangling polymer chains prior to stretching and promoting dipole moment alignment within a crystalline phase. In some embodiments, a polymer thin film may be characterized by an electromechanical coupling factor $k_{31}$ of at least approximately 0.1, e.g., 0.1, 0.2, 0.3, or more, including ranges between any of the foregoing values.

As will be appreciated, and in accordance with some embodiments, the relative orientation of fibers in a woven architecture may be chosen to control in-plane values of the electromechanical coupling factor (e.g., $k_{31}$ and $k_{32}$) and hence the ratio $k_{31}/k_{32}$. For instance, fibers may be woven along a set of one or more predetermined directions, and the number and/or type of fiber(s) woven along a given direction (i.e., at a chosen orientation) may be independently selected.

According to some embodiments, spun PVDF fibers may be incorporated into non-woven structures. Continuous filamentary fibers may be guided along a machine direction of a processing apparatus and bonded together as either oriented or intermixed fibers to form a PVDF fiber thin film. Bonding may be achieved using a thermoplastic or thermoset adhesive, which may be applied in a bath or sprayed onto the assembled fibers.

PVDF fibers may also be chopped, carded, and cross-lapped into a more voluminous non-woven structure. Chopped fibers may also be added to a fiber thin film that includes continuous filaments, as in the previous example. These structures may be needle punched to increase the thickness of the fiber thin film.

In some embodiments, PVDF fibers may be dispersed into a melt-blown film in conjunction with a low viscosity thermoplastic composition such as polypropylene, where chopped PVDF fibers may be oriented perpendicular to the machine direction such that the thickness of the fiber thin film is proportional to the PVDF fiber length. In some examples, the melt-blown material may be electrically conductive such that, under an applied voltage, and in configurations where the perpendicular PVDF fibers are in sufficient contact to accumulate an electric charge, the thickness of the fiber thin film may be increased with applied voltage.

Continuous filamentary PVDF fibers may be co-spun with functional fibers, such as cotton for softness or a metal for electrical conductivity. Such functionalized fibers or chopped and spun PVDF yarns may be weft knitted or warp knitted. For instance, in weft knitting, the PVDF fibers may be oriented along the weft (horizontal) machine direction and knit into a looped configuration or 'in-laid' flat between other layers of knitted material. Such PVDF fibers may also be intarsia knitted into specific regions where expansion/contraction is desired, such as alongside a conductive material (e.g., electrode) that is configured to apply a voltage to the PVDF fiber film.

Spun PVDF fibers may be paired with elastomeric yarns or fibers to form a compliant fabric. Such a fabric may expand or contract without buckling or bending. Alternatively, spun PVDF fibers may be paired with stiff yarns or fibers (e.g., Kevlar, nylon, etc.) that may be configured to restrict expansion/contraction in order to induce buckling patterns in the fabric. In still further examples, PVDF fibers may be incorporated into auxetic textile structures, and may be configured to amplify uniaxial expansion into multiaxial expansion.

Spun PVDF fibers may be tucked into a spacer fabric, where the PVDF may be oriented perpendicular to the machine direction of the material and configured to increase or decrease the material thickness. Spacer, in-laid, and intarsia techniques may be engineered into the same textile structure.

Spun PVDF fibers may be incorporated as the warp or weft of a woven textile, and like knits may be paired with a conductor (e.g., electrode) that is configured to apply a voltage to the PVDF material. In a manner similar to intarsia knitting, PVDF fibers may be jacquard woven into specific sections of a weave and paired with other functional materials as desired.

In further examples, spun PVDF fibers may be machine braided, where fibers may cross-lap each other to form a tube. Such a braided structure may be incorporated into an actuator, such as a McKibben muscle. A PVDF fiber-containing structure may be adapted to create a desired response in the absence of pneumatic actuation.

Spun PVDF fibers may also be embroidered onto a surface, such as a textile, either as a stitched interlocked structure, or laid down flat and secured by over-top stitches.

According to further embodiments, spun PVDF fibers may be uniquely shaped into a desired form factor using 3D knitting or weaving. Intarsia, spacer, and in-laid techniques may also be used In conjunction with knitting, weaving, or embroidery processes, spun PVDF fibers may be extruded over one or more other materials to form a yarn having a core-cladding construction. For instance, spun PVDF fibers may be coiled about an elastic core such that expansion and contraction of the PVDF fibers may induce curvature in the yarn. A core-cladding construction may include a cladding layer configured to shield the core or, in some examples, provide a soft exterior such as for wearable applications.

The presently disclosed PVDF fibers and PVDF fiber thin films may be characterized as optical quality polymer fibers and thin films and may form, or be incorporated into, an optical element such as an actuatable layer. Optical elements may be used in various display devices, such as virtual reality (VR) and augmented reality (AR) glasses and headsets. The efficiency of these and other optical elements may depend on the degree of optical clarity and/or piezoelectric response.

Following orienting, annealing, and poling, the crystals or chains in a PVDF fiber may be at least partially aligned with the direction of the applied tensile stress. An example polymer fiber thin film formed from such fibers may exhibit a high modulus, e.g., greater than 4 GPa, a high piezoelectric coefficient, e.g., $d_{31}$ greater than 5 pC/N, and a high electromechanical coupling factor, e.g., $k_{31}$ greater than 0.1. A further example polymer fiber thin film formed from such fibers may exhibit a high modulus, e.g., greater than 4 GPa, a high degree of birefringence, a high degree of optical clarity, bulk haze of less than approximately 10%, a high piezoelectric coefficient, e.g., $d_{31}$ greater than 5 pC/N, and a high electromechanical coupling factor, e.g., $k_{31}$ greater than 0.1.

In accordance with various embodiments, PVDF fibers and PVDF fiber thin films may include fibrous, amorphous, partially crystalline, or wholly crystalline materials. Such materials may also be mechanically anisotropic, where one or more characteristics including compressive strength, tensile strength, shear strength, yield strength, elastic modulus, shear modulus, hardness, toughness, ductility, machinability, thermal expansion, thermal conductivity, piezoelectric properties, and creep behavior may be directionally dependent.

In further embodiments, a PVDF fiber thin film may be incorporated into a multilayer structure, such as the "A" layer in an ABAB multilayer. Further multilayer architectures may include AB, ABA, or ABC configurations. Each B layer (and each C layer, if provided) may include a further polymer composition, such as polyethylene. According to some embodiments, the B (and C) layer(s) may be electrically conductive and may include, for example, a metal, conductive oxide, or conductive polymer such as indium tin oxide (ITO) or poly(3,4-ethylenedioxythiophene).

In a single layer or multilayer architecture, each PVDF-family layer may have a thickness ranging from approximately 100 nm to approximately 5 mm, e.g., 100, 200, 500, 1000, 2000, 5000, 10000, 20000, 50000, 100000, 200000, 500000, 1000000, 2000000, or 5000000 nm, including ranges between any of the foregoing values. A multilayer stack may include two or more such layers. In some embodiments, a density of a PVDF fiber thin film may range from approximately 1.7 g/cm$^3$ to approximately 1.9 g/cm$^3$, e.g., 1.7, 1.75, 1.8, 1.85, or 1.9 g/cm$^3$, including ranges between any of the foregoing values.

According to some embodiments, the areal dimensions (i.e., length and width) of a PVDF-family fiber thin film may independently range from approximately 5 cm to approximately 50 cm or more, e.g., 5, 10, 20, 30, 40, or 50 cm, including ranges between any of the foregoing values. Example thin films may have areal dimensions of approximately 5 cm×5 cm, 10 cm×10 cm, 20 cm×20 cm, 50 cm×50 cm, 5 cm×10 cm, 10 cm×20 cm, 10 cm×50 cm, etc.

As used herein, the terms "polymer thin film" and "polymer layer" may be used interchangeably. Furthermore, reference to a "polymer thin film" or a "polymer layer" may include reference to a "multilayer polymer thin film" unless the context clearly indicates otherwise.

According to various embodiments, an "optical quality thin film" or an "optical quality polymer thin film" may, in some examples, be characterized by a transmissivity within the visible light spectrum of at least approximately 20%, e.g., 20, 30, 40, 50, 60, 70, 80, 90, 95%, or 100%, including ranges between any of the foregoing values, and less than approximately 10% bulk haze, e.g., 0, 1, 2, 4, 6, or 8% bulk haze, including ranges between any of the foregoing values.

Translucent, transparent, and other optical quality thin films may be manufactured from an assemblage of one or more fibers that may be suitable arrayed, i.e., in one or more directions. For instance, a fiber tow may include from 1 to 1000 or more spun fibers that are woven, knit or matted to form a fiber structure. In some embodiments, the fiber structure may be encapsulated in a resinous matrix. The matrix may include a polymer resin, such as a silicone, acrylate, epoxy, or urethane. The resulting composite, including the fibers and the polymer matrix, may be characterized by a refractive index that is substantially equal to the refractive index of the fibers. In some embodiments, a difference in the refractive index between the composite and the native fibers may be less than approximately 0.1, e.g., less than 0.1, less than 0.05, less than 0.02, or less than 0.01, including ranges between any of the foregoing values.

According to further embodiments, the fiber structure may be consolidated through the application of heat and/or pressure. The elastic modulus of a consolidated fiber structure may be less than the elastic modulus of the fiber structure prior to consolidation, e.g., approximately 10% less, approximately 20% less, or even approximately 50% less.

Aspects of the present disclosure relate to the formation of PVDF fibers, single layer PVDF fiber thin films, as well as multilayer PVDF fiber thin films having improved mechanical and piezoelectric properties. The improved mechanical properties may include improved dimensional stability and improved compliance in conforming to a surface having compound curvature, such as a lens. The disclosed PVDF fiber thin films may be used to fabricate anisotropic piezoelectric substrates, birefringent substrates, high Poisson's ratio thin films, reflective polarizers, birefringent mirrors, and the like, and may be incorporated into AR/VR combiners or used to provide display brightness enhancement.

Features from any of the embodiments described herein may be used in combination with one another in accordance with the general principles described herein. These and other embodiments, features, and advantages will be more fully understood upon reading the following detailed description in conjunction with the accompanying drawings and claims.

Figure 13:
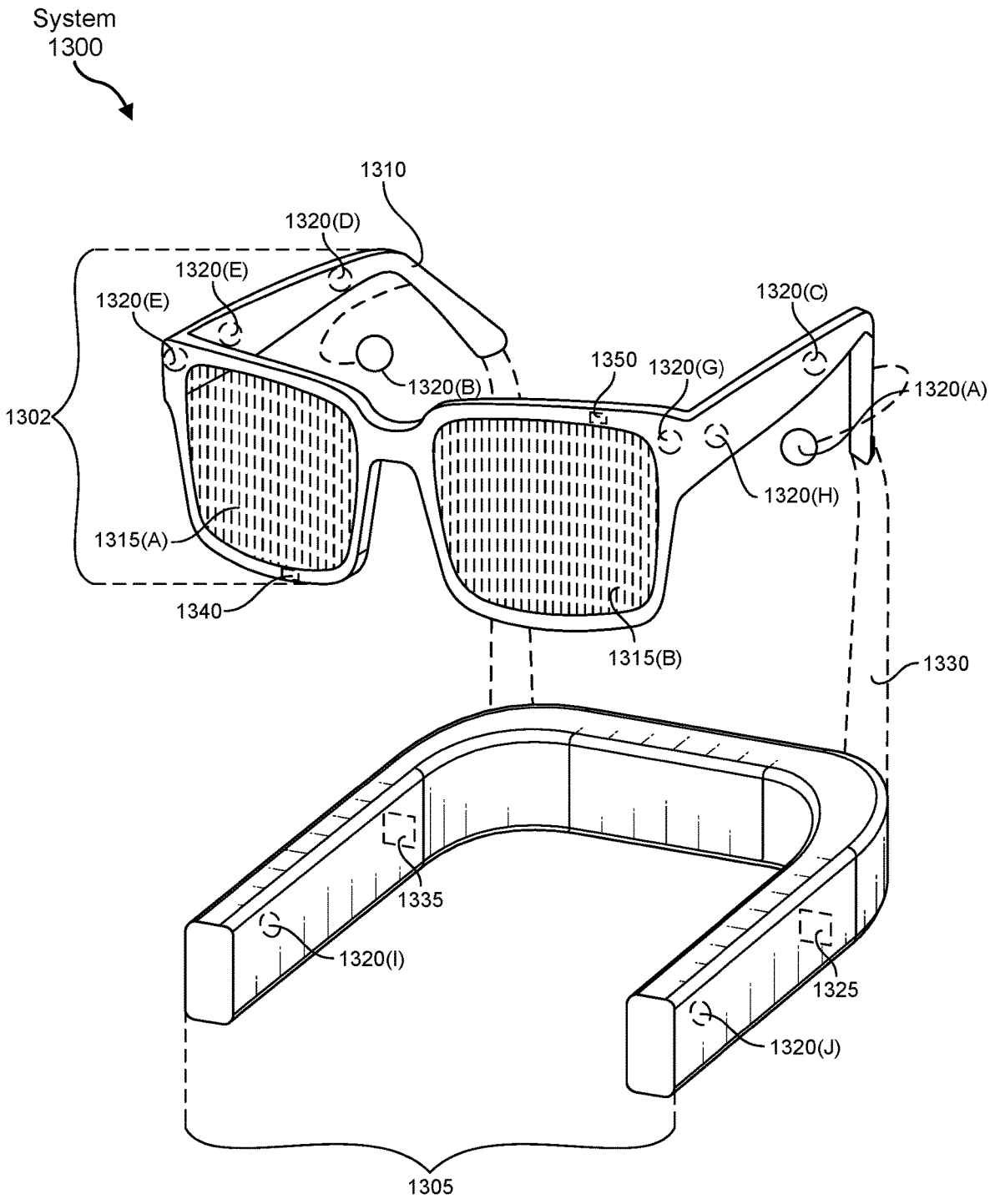
FIG. 13 is an illustration of exemplary augmented-reality glasses that may be used in connection with embodiments of this disclosure.
Figure 14:
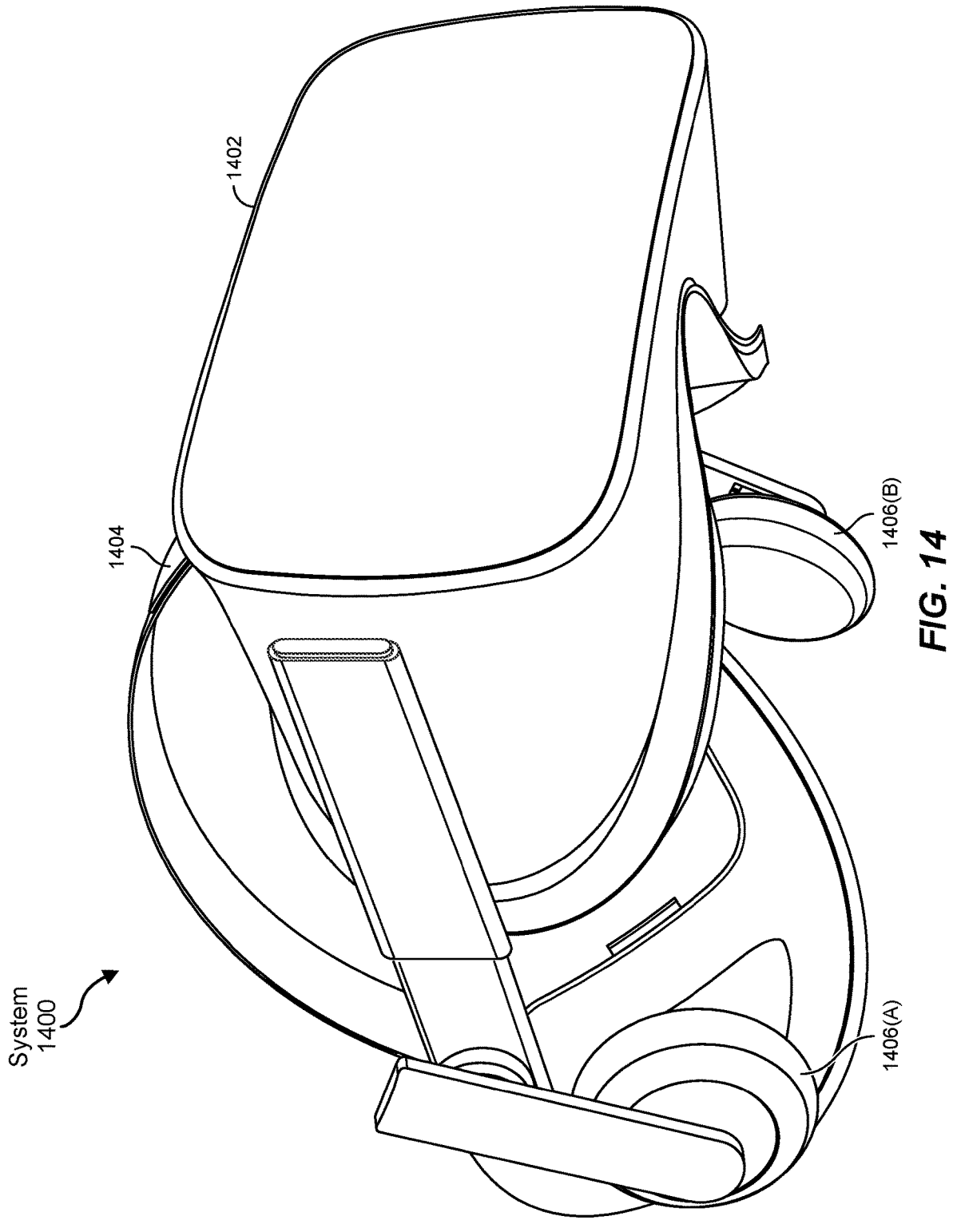
FIG. 14 is an illustration of an exemplary virtual-reality headset that may be used in connection with embodiments of this disclosure.

The following will provide, with reference to FIGS. 1-14, a detailed description of methods for forming high modulus and high piezoelectric response polymer fiber thin films. The discussion associated with FIG. 1 includes a description of an example process flow for forming PVDF fiber thin films. The discussion associated with FIGS. 2-4 includes a description of polymer compositions having a bimodal molecular weight distribution. The discussion associated with FIGS. 5-7 relates to example fiber spinning methods. The discussion associated with FIGS. 8 and 9 includes a description of electroded PVDF fibers and PVDF fiber thin films. The discussion associated with FIGS. 10-12 includes a description of exemplary contact poling methods for aligning and orienting beta phase crystals in PVDF fibers and PVDF fiber thin films. The discussion associated with FIGS. 13 and 14 relates to exemplary virtual reality and augmented reality devices that may include one or more PVDF polymer fiber thin films as disclosed herein.

Referring to FIG. 1, shown is a flowchart detailing an example method for forming a PVDF-family fiber thin film. Method 100 includes the successive or overlapping steps of forming a PVDF solution by combining a crystallizable polymer and a liquid solvent 110, forming a gel from the PVDF solution by removing at least some of the liquid solvent 120, forming a PVDF fiber from the gel 130, stretching the fiber to orient the fiber's microstructure and optionally removing solvent from the oriented fiber 140, annealing the fiber 150, poling the fiber 160, and forming the fiber into a polymer thin film having a high modulus and a high electromechanical efficiency 170.

Figure 2:
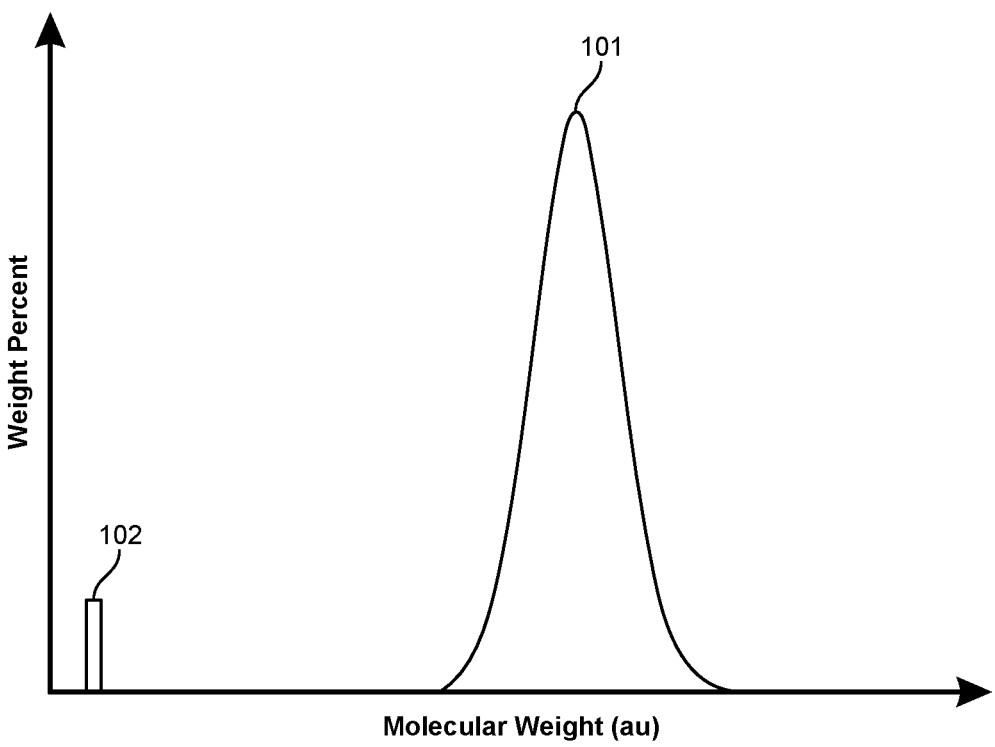
FIG. 2 is a plot showing the bimodal distribution of molecular weights among components of an example polymer gel according to some embodiments.
Figure 3:
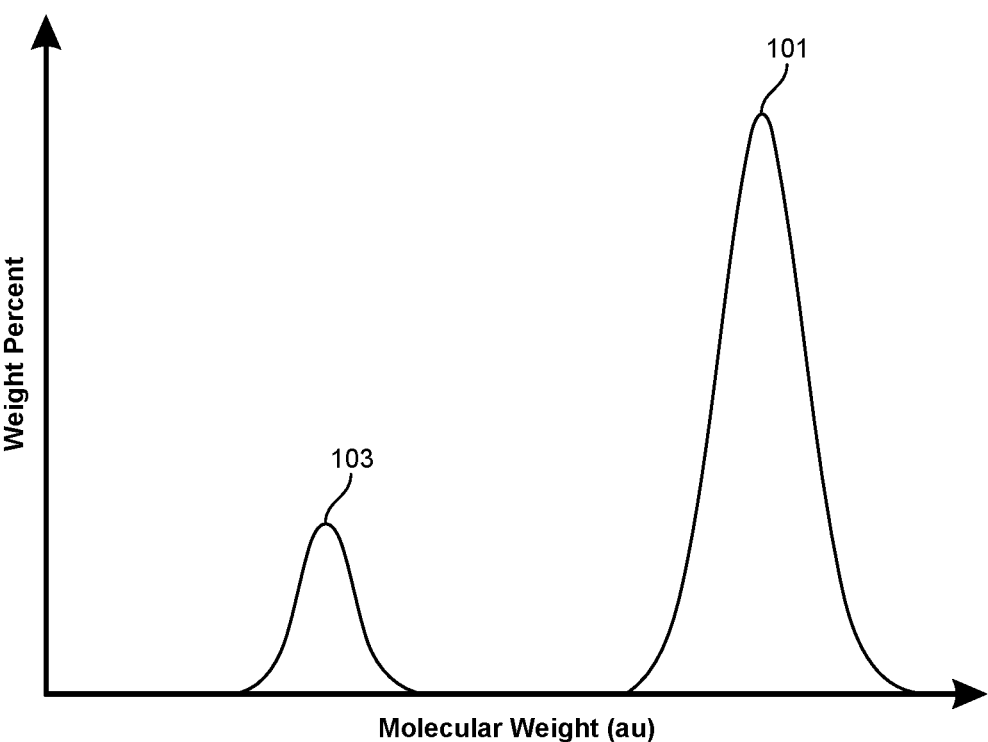
FIG. 3 is a plot showing the bimodal distribution of molecular weights among components of an example polymer gel according to further embodiments.
Figure 4:
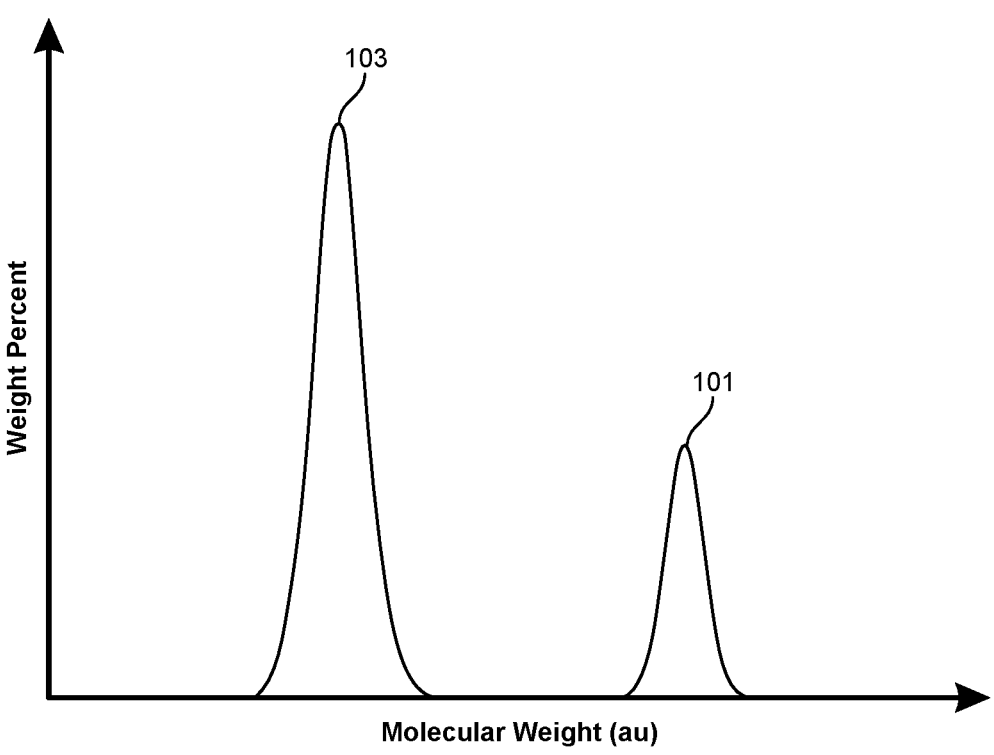
FIG. 4 is a plot showing the bimodal distribution of molecular weights among components of an example polymer gel according to still further embodiments.

Referring to FIG. 2, shown schematically is a composition having a bimodal molecular weight distribution that includes a crystallizable polymer 101 and a low molecular weight additive 102. Referring to FIG. 3, shown schematically is a further composition having a bimodal molecular weight distribution that includes a crystallizable polymer 101 and a low molecular weight additive 103. Referring to FIG. 4, shown schematically is a still further composition having a bimodal molecular weight distribution that includes a crystallizable polymer 101 and a low molecular weight additive 103.

Figure 5:
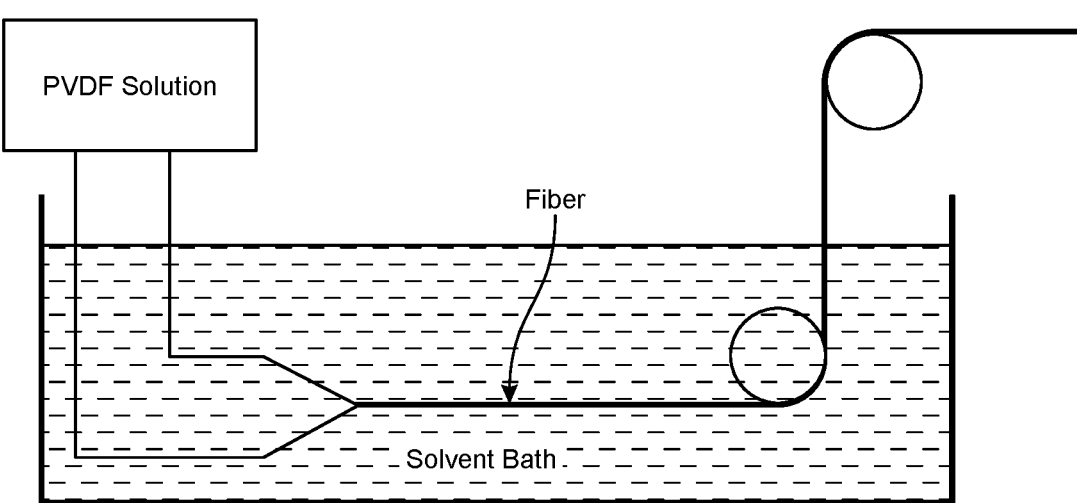
FIG. 5 is a schematic of an example gel spinning method for manufacturing PVDF fibers through precipitation in a solvent bath according to various embodiments.
Figure 6:
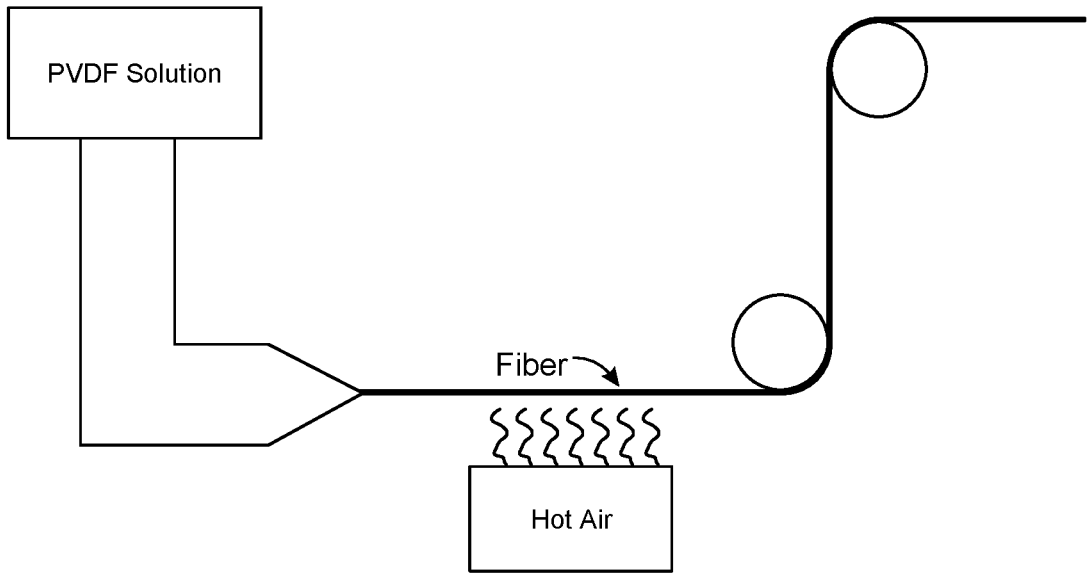
FIG. 6 is a schematic of an example gel spinning method for manufacturing PVDF fibers via solvent evaporation according to various embodiments.
Figure 7:
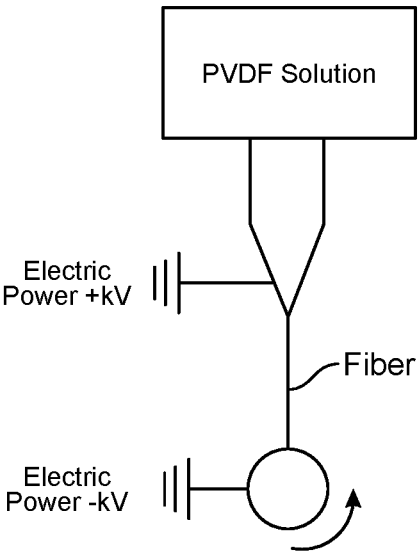
FIG. 7 is a schematic of an example electro-spinning method for manufacturing PVDF fibers according to further embodiments.

An example gel spinning method for forming a PVDF-family fiber is shown in FIG. 5. In the illustrated method, a fiber may be formed by precipitation in a solvent bath following the extrusion of a polymer solution through the spinneret of a nozzle. A further example gel spinning method for forming a PVDF-family fiber is shown in FIG. 6. In the illustrated method, a PVDF solution may be extruded through a spinneret where a PVDF fiber may be formed through solvent evaporation by exposing the extruded fiber to a heated gas. Referring to FIG. 7, shown is an electrospinning method for forming a PVDF-family fiber. In the illustrated method, a PVDF solution may be extruded through a spinneret biased at a first potential to form a fiber that is taken up by a collection roller biased at a second potential.

Figure 8:
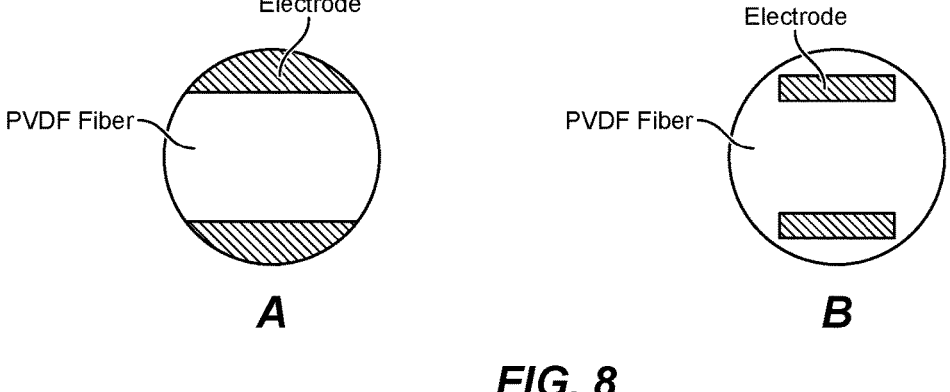
FIG. 8 shows schematic cross-sectional views of electroded PVDF fibers with (A) opposing electrodes disposed over the fiber surface, and (B) opposing electrodes embedded within the fiber according to some embodiments.
Figure 9:
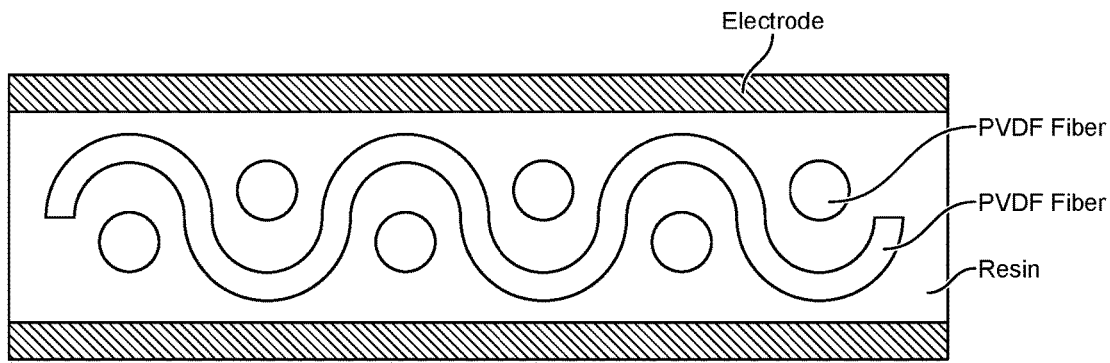
FIG. 9 shows a schematic cross-sectional view of an electroded PVDF fiber thin film according to some embodiments.

In certain embodiments, conductive electrodes may be applied in an opposing manner to portions of a PVDF fiber or thin film. Referring to FIG. 8, shown are cross-sectional views of example electroded PVDF fibers. As illustrated in FIG. 8A, opposing electrodes may be formed over exposed surfaces of a PVDF fiber. As illustrated in FIG. 8B, opposing electrodes may be embedded within a fiber. Referring to FIG. 9, shown is a schematic cross-sectional view of an electroded PVDF fiber thin film. The thin film includes a woven array of PVDF fibers embedded within a resinous matrix.

The electrodes may include one or more electrically conductive materials, such as a metal, conductive polymer, or conductive oxide. The electrodes may include a blanket or patterned structure, and may include an electrically conductive material (i.e., particles) dispersed throughout a matrix. Electrically conductive particles may include nanoparticles, nanowires (e.g., silver nanowires), nanotubes (e.g., carbon nanotubes), transparent conductive oxides, graphene (e.g., graphene flakes), oxidized graphene, fluorinated graphene, hydrogenated graphene, other graphene derivatives, and carbon black, for example. Example transparent conductive oxides (TCOs) include indium tin oxide (ITO) and indium gallium zinc oxide (IGZO), although further TCOs are contemplated. In some embodiments, an electrode may include a low melting temperature composition (e.g., alloy), such as indium, tin, gallium, and the like, which may be co-extruded with a spun fiber. In some embodiments, the electrodes may have an electrical conductivity of at least approximately 1 S/cm.

A contact poling method may be used to align beta phase crystals within a PVDF fiber. A poling voltage may be applied between conductive components of the fiber, including a conductive core and a conductive coating or an adjacent fiber. In some embodiments, the poling voltage and the poling time may be controlled to achieve the desired piezoelectric properties within the fiber without inducing mechanical damage.

In some approaches, a conductive coating may be formed over an outer surface of the PVDF fiber using any suitable method, e.g., vapor deposition, spray-coating, dip-coating, roll-coating, etc. The PVDF fiber may include a conductive core.

Figure 10:
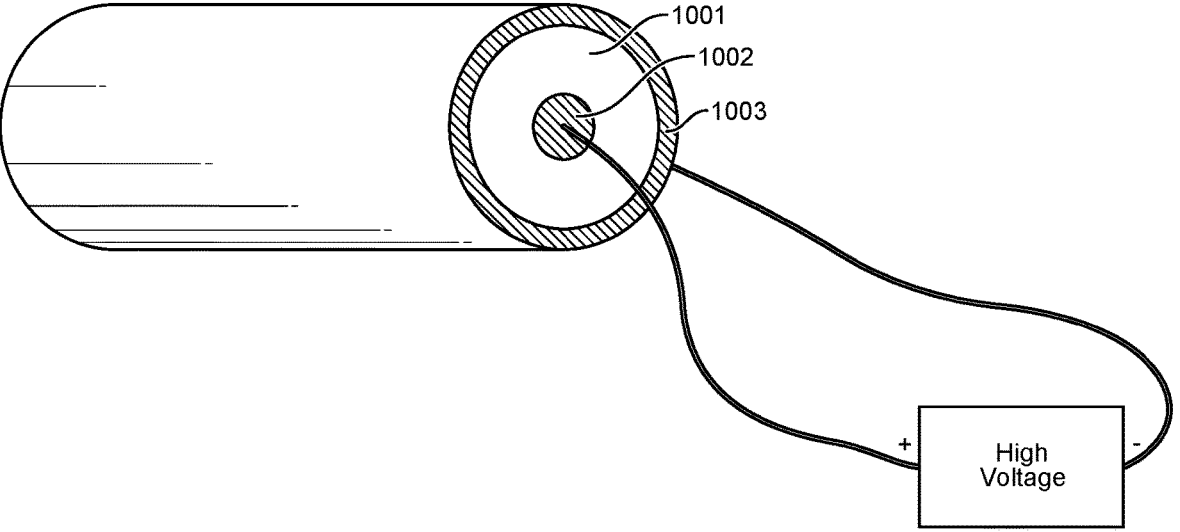
FIG. 10 is a schematic illustration of a method for contact poling a PVDF fiber spun with a conductive core and a conductive coating according to some embodiments.
Figure 11:
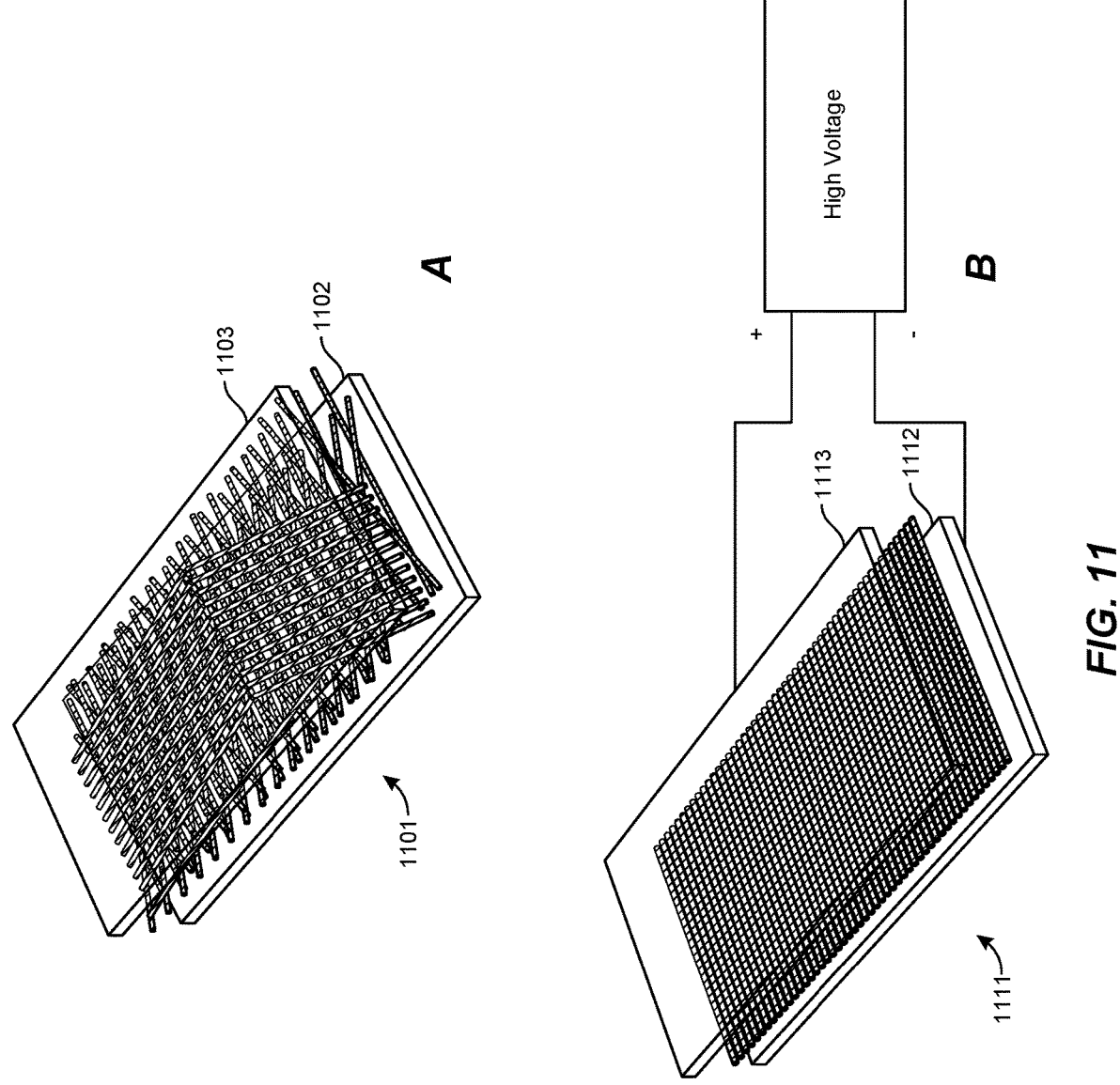
FIG. 11 illustrates a method for contact poling a PVDF fiber thin film having (A) woven or (B) aligned PVDF fibers according to various embodiments.

Referring FIG. 10, a PVDF fiber 1001 may be co-axially spun with a conductive core 1002 and a conductive coating 1003 may be formed over an outer surface of the fiber 1001. A poling voltage may be applied between the conductive core 1002 and the conductive coating 1003 to align and orient beta phase crystals within the PVDF fiber 1001. For instance, beta phase crystals may be aligned along radial directions of the fiber.

A contact poling method may be used to align beta phase crystals within a PVDF fiber thin film. For instance, contact poling may be performed on a woven, knit, or embroidered PVDF film that is sandwiched between a pair of conductive layers. The conductive layers may be formed by any suitable method, including vapor deposition, spray-coating, dip-coating, roll-coating, etc. Referring to FIG. 11A, a woven PVDF fiber thin film 1101 is disposed between a bottom electrode 1102 and a top electrode 1103. Referring to FIG. 11B, an aligned PVDF fiber thin film 1111 is disposed between a bottom electrode 1112 and a top electrode 1113.

Figure 12:
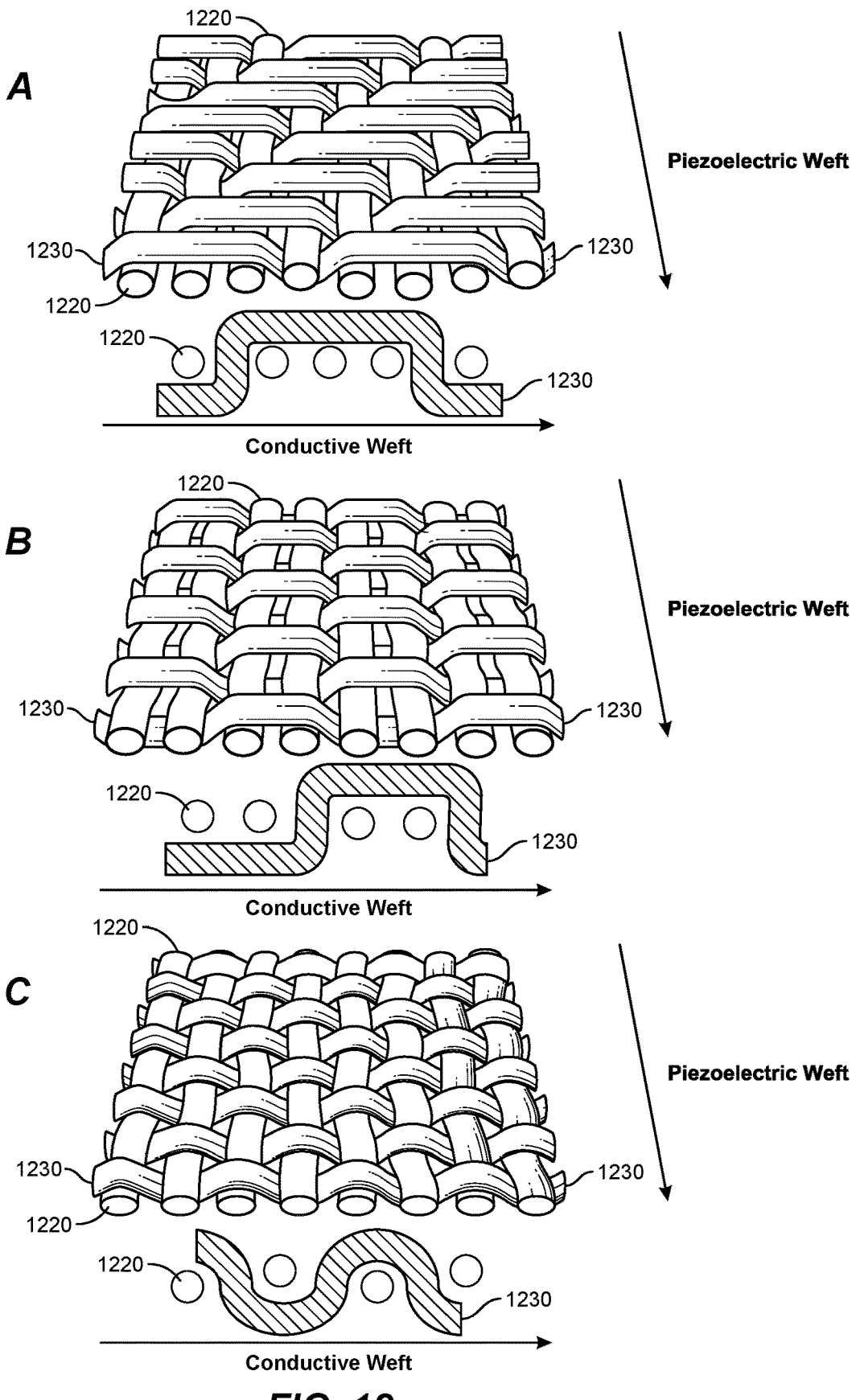
FIG. 12 illustrates a method for contact poling a PVDF fiber thin film woven with conductive filaments according to certain embodiments.

Referring to FIG. 12, a contact poling method may be used to align beta phase crystals within a woven thin film composite of PVDF fibers and conductive filaments. In the illustrated embodiments of FIGS. 12A-12C, the fibers 1220 and the filaments 1230 are disposed in mutually orthogonal configurations, although it will be appreciated that alternate woven architectures are contemplated. Example conductive filaments include metal wires, carbon fibers, carbon nanotubes, etc. A poling voltage may be applied across the conductive filaments to align and orient beta phase crystals within the PVDF fibers.

As disclosed herein, a piezoelectric polymer thin film may be characterized by a Young's modulus of at least approximately 4 GPa and an electromechanical coupling factor, $k_{31}$, of at least approximately 0.1. The polymer thin film may be formed by assembling (i.e., weaving or laminating) gel-spun or electro-spun PVDF family fibers. A polymer solution used to form a spinnable gel may include a crystallizable polymer, a low molecular weight additive, and a liquid solvent.

The crystallizable polymer and the low molecular weight additive may be independently selected to include vinylidene fluoride (VDF), trifluoroethylene (TrFE), chlorotrifluoroethylene (CTFE), hexafluoropropene (HFP), vinyl fluoride (VF), as well as homopolymers, co-polymers, tri-polymers, derivatives, and combinations thereof. The high molecular weight component of the polymer solution may have a molecular weight of at least 100,000 g/mol, whereas the low molecular weight additive may have a molecular weight of less than 200,000 g/mol and may constitute 0.1 wt. % to 90 wt. % of the polymer fibers. The choice of solvent may facilitate chain disentanglement and accordingly polymer chain and dipole alignment, e.g., during orienting. The polymer solution may be gelled using one or more process selected from cooling the polymer solution, evaporating the liquid solvent from the polymer solution, and adding a poor solvent to the polymer solution.

Gel-spun fibers may be precipitated in a solvent bath, for example. The application of a uniaxial stress to a spun fiber may be used to align polymer chains and/or orient crystals to induce optical and/or mechanical anisotropy. The spun fibers may be annealed and poled. By forming fibers intermediate to the formation of a polymer thin film, a higher stretch ratio may be attained during orienting, which may produce a greater crystalline content, higher modulus, and higher piezoelectric response in the resulting polymer thin film.

An example method may include forming a solution of a crystallizable polymer and a liquid solvent, removing a portion of the liquid solvent to form a polymer gel, forming fibers from the polymer gel, and then orienting, annealing, and poling the fibers. The fibers may be electroded and woven, cross-linked, laminated, etc. to form a high modulus and piezoelectric PVDF fiber thin film. Such a thin film may be used to fabricate anisotropic piezoelectric substrates, birefringent substrates, high Poisson's ratio thin films, reflective polarizers, birefringent mirrors, and the like, and may be incorporated into AR/VR combiners or used to provide display brightness enhancement.

EXAMPLE EMBODIMENTS

Example 1: A polymer fiber includes a crystalline PVDF-family polymer having a molecular weight of at least approximately 100,000 g/mol, where the polymer fiber has an elastic modulus of at least approximately 4 GPa and an electromechanical coupling factor ($k_{31}$) of at least approximately 0.1.

Example 2: The polymer fiber of Example 1, where the crystalline PVDF-family polymer includes a moiety selected from vinylidene fluoride, trifluoroethylene, chlorotrifluoroethylene, hexafluoropropene, vinyl fluoride, homopolymers thereof, co-polymers thereof, tri-polymers thereof, and derivatives thereof.

Example 3: The polymer fiber of any of Examples 1 and 2, where the polymer fiber has a piezoelectric coefficient ($d_{31}$) of at least approximately 5 pC/N.

Example 4: The polymer fiber of any of Examples 1-3, further including an additive having a molecular weight of less than approximately 25,000 g/mol.

Example 5: The polymer fiber of Example 4, where the additive includes a moiety selected from vinylidene fluoride, trifluoroethylene, chlorotrifluoroethylene, hexafluoropropene, vinyl fluoride, homopolymers thereof, co-polymers thereof, tri-polymers thereof, and derivatives thereof.

Example 6: The polymer fiber of any of Examples 1-5, where a molecular weight distribution of polymers within the polymer fiber is selected from monodisperse, polydisperse, and bimodal.

Example 7: A polymer thin film including the polymer fiber of any of Examples 1-6.

Example 8: A polymer thin film includes a plurality of polymer fibers each including a crystalline PVDF-family polymer having a weight average molecular weight of at least approximately 100,000 g/mol, where the polymer thin film has an elastic modulus of at least approximately 4 GPa and an electromechanical coupling factor ($k_{31}$) of at least approximately 0.1.

Example 9: The polymer thin film of Example 8, where the crystalline PVDF-family polymer is preferentially oriented along a predetermined axis.

Example 10: The polymer thin film of any of Examples 8 and 9, further including an additive having a molecular weight of less than approximately 25,000 g/mol.

Example 11: The polymer thin film of any of Examples 8-10, where the polymer thin film is optically clear and has less than approximately 10% bulk haze.

Example 12: A method includes forming a polymer solution from a crystallizable polymer and a liquid solvent, forming a gel from the polymer solution, spinning the gel to form a polymer fiber, stretching the polymer fiber to a stretch ratio of at least approximately 8 to form an oriented fiber, annealing the oriented fiber, and applying an electric field to the oriented fiber, where an elastic modulus of the oriented fiber is at least approximately 4 GPa and an electromechanical coupling factor ($k_{31}$) of the oriented fiber is at least approximately 0.1.

Example 13: The method of Example 12, where forming the gel includes a process selected from cooling the polymer solution, evaporating the liquid solvent, and adding a poor solvent to the polymer solution.

Example 14: The method of any of Examples 12-13, where spinning the gel includes exposing the polymer fiber to a liquid solvent or a heated gas.

Example 15: The method of any of Examples 12-14, where spinning the gel includes electro-spinning.

Example 16: The method of any of Examples 12-15, where the electric field is applied during or after the stretching.

Example 17: The method of any of Examples 12-16, where the electric field is applied during or after the annealing.

Example 18: The method of any of Examples 12-17, further including forming a polymer fiber thin film from the oriented fiber by a process selected from weaving, cross-linking, and laminating the oriented fiber.

Example 19: The method of Example 18, further including weaving a selected number and type of the oriented fibers along each of two or more in-plane directions.

Example 20: The method of any of Examples 18 and 19, further including embedding the polymer fiber thin film in a polymer matrix.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 1300 in FIG. 10) or that visually immerses a user in an artificial reality (such as, e.g., virtual-reality system 1400 in FIG. 11). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Turning to FIG. 10, augmented-reality system 1300 may include an eyewear device 1302 with a frame 1310 configured to hold a left display device 1315(A) and a right display device 1315(B) in front of a user's eyes. Display devices 1315(A) and 1315(B) may act together or independently to present an image or series of images to a user. While augmented-reality system 1300 includes two displays, embodiments of this disclosure may be implemented in augmented-reality systems with a single NED or more than two NEDs.

In some embodiments, augmented-reality system 1300 may include one or more sensors, such as sensor 1340. Sensor 1340 may generate measurement signals in response to motion of augmented-reality system 1300 and may be located on substantially any portion of frame 1310. Sensor 1340 may represent one or more of a variety of different sensing mechanisms, such as a position sensor, an inertial measurement unit (IMU), a depth camera assembly, a structured light emitter and/or detector, or any combination thereof. In some embodiments, augmented-reality system 1300 may or may not include sensor 1340 or may include more than one sensor. In embodiments in which sensor 1340 includes an IMU, the IMU may generate calibration data based on measurement signals from sensor 1340. Examples of sensor 1340 may include, without limitation, accelerometers, gyroscopes, magnetometers, other suitable types of sensors that detect motion, sensors used for error correction of the IMU, or some combination thereof.

In some examples, augmented-reality system 1300 may also include a microphone array with a plurality of acoustic transducers 1320(A)-1320(J), referred to collectively as acoustic transducers 1320. Acoustic transducers 1320 may represent transducers that detect air pressure variations induced by sound waves. Each acoustic transducer 1320 may be configured to detect sound and convert the detected sound into an electronic format (e.g., an analog or digital format). The microphone array in FIG. 10 may include, for example, ten acoustic transducers: 1320(A) and 1320(B), which may be designed to be placed inside a corresponding ear of the user, acoustic transducers 1320(C), 1320(D), 1320(E), 1320(F), 1320(G), and 1320(H), which may be positioned at various locations on frame 1310, and/or acoustic transducers 1320(1) and 1320(J), which may be positioned on a corresponding neckband 1305.

In some embodiments, one or more of acoustic transducers 1320(A)-(J) may be used as output transducers (e.g., speakers). For example, acoustic transducers 1320(A) and/or 1320(B) may be earbuds or any other suitable type of headphone or speaker.

The configuration of acoustic transducers 1320 of the microphone array may vary. While augmented-reality system 1300 is shown in FIG. 10 as having ten acoustic transducers 1320, the number of acoustic transducers 1320 may be greater or less than ten. In some embodiments, using higher numbers of acoustic transducers 1320 may increase the amount of audio information collected and/or the sensitivity and accuracy of the audio information. In contrast, using a lower number of acoustic transducers 1320 may decrease the computing power required by an associated controller 1350 to process the collected audio information. In addition, the position of each acoustic transducer 1320 of the microphone array may vary. For example, the position of an acoustic transducer 1320 may include a defined position on the user, a defined coordinate on frame 1310, an orientation associated with each acoustic transducer 1320, or some combination thereof.

Acoustic transducers 1320(A) and 1320(B) may be positioned on different parts of the user's ear, such as behind the pinna, behind the tragus, and/or within the auricle or fossa. Or, there may be additional acoustic transducers 1320 on or surrounding the ear in addition to acoustic transducers 1320 inside the ear canal. Having an acoustic transducer 1320 positioned next to an ear canal of a user may enable the microphone array to collect information on how sounds arrive at the ear canal. By positioning at least two of acoustic transducers 1320 on either side of a user's head (e.g., as binaural microphones), augmented-reality device 1300 may simulate binaural hearing and capture a 3D stereo sound field around about a user's head. In some embodiments, acoustic transducers 1320(A) and 1320(B) may be connected to augmented-reality system 1300 via a wired connection 1330, and in other embodiments acoustic transducers 1320(A) and 1320(B) may be connected to augmented-reality system 1300 via a wireless connection (e.g., a BLUETOOTH connection). In still other embodiments, acoustic transducers 1320(A) and 1320(B) may not be used at all in conjunction with augmented-reality system 1300.

Acoustic transducers 1320 on frame 1310 may be positioned in a variety of different ways, including along the length of the temples, across the bridge, above or below display devices 1315(A) and 1315(B), or some combination thereof. Acoustic transducers 1320 may also be oriented such that the microphone array is able to detect sounds in a wide range of directions surrounding the user wearing the augmented-reality system 1300. In some embodiments, an optimization process may be performed during manufacturing of augmented-reality system 1300 to determine relative positioning of each acoustic transducer 1320 in the microphone array.

In some examples, augmented-reality system 1300 may include or be connected to an external device (e.g., a paired device), such as neckband 1305. Neckband 1305 generally represents any type or form of paired device. Thus, the following discussion of neckband 1305 may also apply to various other paired devices, such as charging cases, smart watches, smart phones, wrist bands, other wearable devices, hand-held controllers, tablet computers, laptop computers, other external compute devices, etc.

As shown, neckband 1305 may be coupled to eyewear device 1302 via one or more connectors. The connectors may be wired or wireless and may include electrical and/or non-electrical (e.g., structural) components. In some cases, eyewear device 1302 and neckband 1305 may operate independently without any wired or wireless connection between them. While FIG. 10 illustrates the components of eyewear device 1302 and neckband 1305 in example locations on eyewear device 1302 and neckband 1305, the components may be located elsewhere and/or distributed differently on eyewear device 1302 and/or neckband 1305. In some embodiments, the components of eyewear device 1302 and neckband 1305 may be located on one or more additional peripheral devices paired with eyewear device 1302, neckband 1305, or some combination thereof.

Pairing external devices, such as neckband 1305, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 1300 may be provided by a paired device or shared between a paired device and an eyewear device, thus reducing the weight, heat profile, and form factor of the eyewear device overall while still retaining desired functionality. For example, neckband 1305 may allow components that would otherwise be included on an eyewear device to be included in neckband 1305 since users may tolerate a heavier weight load on their shoulders than they would tolerate on their heads. Neckband 1305 may also have a larger surface area over which to diffuse and disperse heat to the ambient environment. Thus, neckband 1305 may allow for greater battery and computation capacity than might otherwise have been possible on a stand-alone eyewear device. Since weight carried in neckband 1305 may be less invasive to a user than weight carried in eyewear device 1302, a user may tolerate wearing a lighter eyewear device and carrying or wearing the paired device for greater lengths of time than a user would tolerate wearing a heavy stand-alone eyewear device, thereby enabling users to more fully incorporate artificial-reality environments into their day-to-day activities.

Neckband 1305 may be communicatively coupled with eyewear device 1302 and/or to other devices. These other devices may provide certain functions (e.g., tracking, localizing, depth mapping, processing, storage, etc.) to augmented-reality system 1300. In the embodiment of FIG. 10, neckband 1305 may include two acoustic transducers (e.g., 1320(1) and 1320(J)) that are part of the microphone array (or potentially form their own microphone subarray). Neckband 1305 may also include a controller 1325 and a power source 1335.

Acoustic transducers 1320(1) and 1320(J) of neckband 1305 may be configured to detect sound and convert the detected sound into an electronic format (analog or digital). In the embodiment of FIG. 10, acoustic transducers 1320(1) and 1320(J) may be positioned on neckband 1305, thereby increasing the distance between the neckband acoustic transducers 1320(1) and 1320(J) and other acoustic transducers 1320 positioned on eyewear device 1302. In some cases, increasing the distance between acoustic transducers 1320 of the microphone array may improve the accuracy of beamforming performed via the microphone array. For example, if a sound is detected by acoustic transducers 1320(C) and 1320(D) and the distance between acoustic transducers 1320(C) and 1320(D) is greater than, e.g., the distance between acoustic transducers 1320(D) and 1320(E), the determined source location of the detected sound may be more accurate than if the sound had been detected by acoustic transducers 1320(D) and 1320(E).

Controller 1325 of neckband 1305 may process information generated by the sensors on neckband 1305 and/or augmented-reality system 1300. For example, controller 1325 may process information from the microphone array that describes sounds detected by the microphone array. For each detected sound, controller 1325 may perform a direction-of-arrival (DOA) estimation to estimate a direction from which the detected sound arrived at the microphone array. As the microphone array detects sounds, controller 1325 may populate an audio data set with the information. In embodiments in which augmented-reality system 1300 includes an inertial measurement unit, controller 1325 may compute all inertial and spatial calculations from the IMU located on eyewear device 1302. A connector may convey information between augmented-reality system 1300 and neckband 1305 and between augmented-reality system 1300 and controller 1325. The information may be in the form of optical data, electrical data, wireless data, or any other transmittable data form. Moving the processing of information generated by augmented-reality system 1300 to neckband 1305 may reduce weight and heat in eyewear device 1302, making it more comfortable to the user.

Power source 1335 in neckband 1305 may provide power to eyewear device 1302 and/or to neckband 1305. Power source 1335 may include, without limitation, lithium ion batteries, lithium-polymer batteries, primary lithium batteries, alkaline batteries, or any other form of power storage. In some cases, power source 1335 may be a wired power source. Including power source 1335 on neckband 1305 instead of on eyewear device 1302 may help better distribute the weight and heat generated by power source 1335.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 1400 in FIG. 11, that mostly or completely covers a user's field of view. Virtual-reality system 1400 may include a front rigid body 1402 and a band 1404 shaped to fit around a user's head. Virtual-reality system 1400 may also include output audio transducers 1406(A) and 1406(B). Furthermore, while not shown in FIG. 11, front rigid body 1402 may include one or more electronic elements, including one or more electronic displays, one or more inertial measurement units (IMUS), one or more tracking emitters or detectors, and/or any other suitable device or system for creating an artificial-reality experience.

Artificial-reality systems may include a variety of types of visual feedback mechanisms. For example, display devices in augmented-reality system 1300 and/or virtual-reality system 1400 may include one or more liquid crystal displays (LCDs), light emitting diode (LED) displays, microLED displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., conventional concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial-reality systems described herein may include one or more projection systems. For example, display devices in augmented-reality system 1300 and/or virtual-reality system 1400 may include microLED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 1300 and/or virtual-reality system 1400 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

The process parameters and sequence of the steps described and/or illustrated herein are given by way of example only and may be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

It will be understood that when an element such as a layer or a region is referred to as being formed on, deposited on, or disposed "on" or "over" another element, it may be located directly on at least a portion of the other element, or one or more intervening elements may also be present. In contrast, when an element is referred to as being "directly on" or "directly over" another element, it may be located on at least a portion of the other element, with no intervening elements present.

As used herein, the term "approximately" in reference to a particular numeric value or range of values may, in certain embodiments, mean and include the stated value as well as all values within 10% of the stated value. Thus, by way of example, reference to the numeric value "50" as "approximately 50" may, in certain embodiments, include values equal to 50±5, i.e., values within the range 45 to 55.

As used herein, the term "substantially" in reference to a given parameter, property, or condition may mean and include to a degree that one of ordinary skill in the art would understand that the given parameter, property, or condition is met with a small degree of variance, such as within acceptable manufacturing tolerances. By way of example, depending on the particular parameter, property, or condition that is substantially met, the parameter, property, or condition may be at least approximately 90% met, at least approximately 95% met, or even at least approximately 99% met.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to a polymer thin film that comprises or includes polyvinylidene fluoride include embodiments where a polymer thin film consists essentially of polyvinylidene fluoride and embodiments where a polymer thin film consists of polyvinylidene fluoride.

What is claimed is:

1. A polymer fiber comprising:

a crystalline polymer comprising a material selected from the group consisting of vinylidene fluoride, trifluoroethylene, chlorotrifluoroethylene, hexafluoropropene, vinyl fluoride, homopolymers thereof, co-polymers thereof, tri-polymers thereof, and derivatives thereof, wherein the crystalline polymer has a molecular weight between 100,000 g/mol and 500,000 g/mol, wherein the polymer fiber is formed by stretching a gel spun polymer fiber at a stretch ratio between 8 and 40, annealing the stretched polymer fiber under an applied stress between 100 MPa and 250 MPa at a temperature greater than 80° C., and poling the annealed polymer fiber at an applied voltage between 200 V/micrometer and 600 V/micrometer, wherein the polymer fiber has a Young's modulus between 4 GPa and 15 GPa, and an electromechanical coupling factor ($k_{31}$) between 0.1 and 0.3.

2. The polymer fiber of claim 1, wherein the polymer fiber has a piezoelectric coefficient ($d_{31}$) of at least 5 pC/N.

3. The polymer fiber of claim 1, further comprising an additive having a molecular weight of less than 25,000 g/mol.

4. The polymer fiber of claim 3, wherein the additive comprises a moiety selected from the group consisting of vinylidene fluoride, trifluoroethylene, chlorotrifluoroethylene, hexafluoropropene, vinyl fluoride, homopolymers thereof, co-polymers thereof, tri-polymers thereof, and derivatives thereof.

5. The polymer fiber of claim 1, wherein a molecular weight distribution of polymers within the polymer fiber is selected from the group consisting of monodisperse, polydisperse, and bimodal.

6. A polymer thin film comprising the polymer fiber of claim 1.

7. A polymer thin film, comprising:

a plurality of polymer fibers each comprising a crystalline polymer comprising a material selected from the group consisting of vinylidene fluoride, trifluoroethylene, chlorotrifluoroethylene, hexafluoropropene, vinyl fluoride, homopolymers thereof, co-polymers thereof, tri-polymers thereof, and derivatives thereof, wherein the crystalline polymer has a weight average molecular weight between 100,000 g/mol and 500,000 g/mol; and the plurality of polymer fibers within the polymer thin film are formed by stretching a gel spun plurality of polymer fibers at a stretch ratio between 8 and 10, annealing the stretched plurality of polymer fibers under an applied stress between 100 MPa and 250 MPa at a temperature greater than 80° C., and poling the annealed plurality of polymer fibers at an applied voltage between 200 V/micrometer and 600 V/micrometer, wherein the polymer thin film has a Young's modulus between 4 GPa and 15 GPa, and an electromechanical coupling factor ($k_{31}$) between 0.1 and 0.3.

8. The polymer thin film of claim 7, wherein the crystalline polymer of the each of the plurality of fibers is preferentially oriented along a predetermined axis.

9. The polymer thin film of claim 7, further comprising an additive having a molecular weight of less than 25,000 g/mol.

10. The polymer thin film of claim 7, wherein the polymer thin film is optically clear and has less than 10% bulk haze.

11. A method comprising:

forming a polymer solution comprising a crystallizable polymer content selected from the group consisting of vinylidene fluoride, trifluoroethylene, chlorotrifluoroethylene, hexafluoropropene, vinyl fluoride, homopolymers thereof, co-polymers thereof, tri-polymers thereof, and derivatives thereof, and a liquid solvent;

forming a gel from the polymer solution;

spinning the gel to form a polymer fiber;

stretching the polymer fiber to a stretch ratio between 8 and 40 to form an oriented fiber;

annealing the oriented fiber under an applied stress between 100 MPa and 250 MPa at a temperature greater than 80° C.; and poling the oriented fiber at an applied voltage between 200 V/micrometer and 600 V/micrometer, wherein a Young's modulus of the oriented fiber is between 4 GPa and 15 GPa, and an electromechanical coupling factor $(k_{31})$ of the oriented fiber is between 0.1 and 0.3.

12. The method of claim 11, wherein forming the gel comprises a process selected from the group consisting of cooling the polymer solution, evaporating the liquid solvent, and adding a poor solvent to the polymer solution.

13. The method of claim 11, wherein spinning the gel comprises exposing the polymer fiber to a liquid solvent or a heated gas.

14. The method of claim 11, wherein spinning the gel comprises electro-spinning.

15. The method of claim 11, wherein an electric field is applied during or after the stretching.

16. The method of claim 11, wherein an electric field is applied during or after the annealing.

17. The method of claim 11, further comprising forming a polymer fiber thin film from the oriented fiber by a process selected from the group consisting of weaving, cross-linking, and laminating the oriented fiber.

18. The method of claim 17, further comprising weaving a selected number and type of the oriented fibers along each of two or more in-plane directions.

19. The method of claim 17, further comprising embedding the polymer fiber thin film in a polymer matrix.

* * * * *